United States Patent [19]

Wilson

[11] Patent Number: 4,457,765
[45] Date of Patent: * Jul. 3, 1984

[54] ABRASIVE BODIES

[76] Inventor: William I. Wilson, 18 East St., East Town Johannesburg, Transvaal, South Africa

[*] Notice: The portion of the term of this patent subsequent to Aug. 26, 1997 has been disclaimed.

[21] Appl. No.: 459,130

[22] Filed: Jan. 19, 1983

Related U.S. Application Data

[63] Continuation of Ser. No. 240,890, Mar. 5, 1981, abandoned, which is a continuation of Ser. No. 14,549, Feb. 23, 1979, abandoned.

[30] Foreign Application Priority Data

Feb. 28, 1978 [ZA] South Africa .................. 78/1154

[51] Int. Cl.³ .............................................. B24D 11/00
[52] U.S. Cl. .................... 51/293; 51/209 R; 51/295; 51/307; 51/309; 408/145
[58] Field of Search ................ 51/293, 295, 307, 309, 51/209 R; 408/145

[56] References Cited

U.S. PATENT DOCUMENTS 3,101,260  8/1957  Cheney ............................... 51/293
3,745,623  7/1973  Wentrof et al. ................ 76/101 A
4,156,329  5/1979  Daniels et al. ..................... 51/295

FOREIGN PATENT DOCUMENTS 1489130  10/1977  United Kingdom .

Primary Examiner—Donald E. Czaja
Assistant Examiner—W. Thompson
Attorney, Agent, or Firm—Handal & Morofsky

[57] ABSTRACT

The invention provides an abrasive body suitable for mounting in a tool for abrading operations, the body including an abrasive compact comprising a mass of abrasive particles, present in an amount of at least 70 percent by volume of the compact, bonded into a hard conglomerate and support means covering a part of the surface of the compact and bonded to the compact, characterized in that the support means covers more than 50 percent of the surface of the compact and the compact presents an arcuate formation, salient in relation to the support means, capable of abrading a workpiece.

15 Claims, 7 Drawing Figures

U.S. Patent  Jul. 3, 1984  4,457,765
FIG. 2
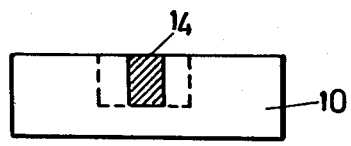
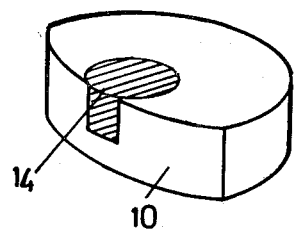
FIG. 1
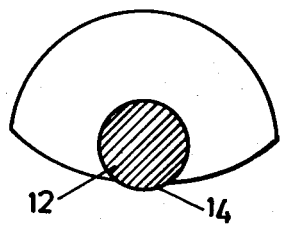
FIG. 3
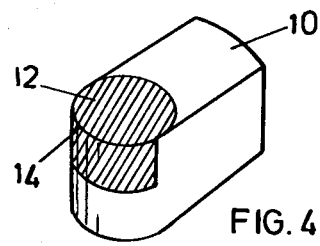
FIG. 4
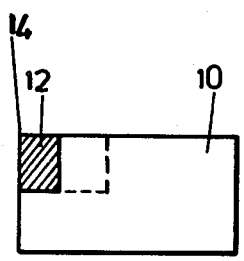
FIG. 5
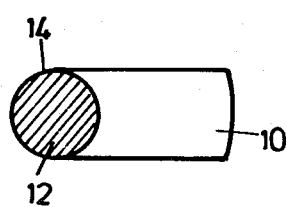
FIG. 6
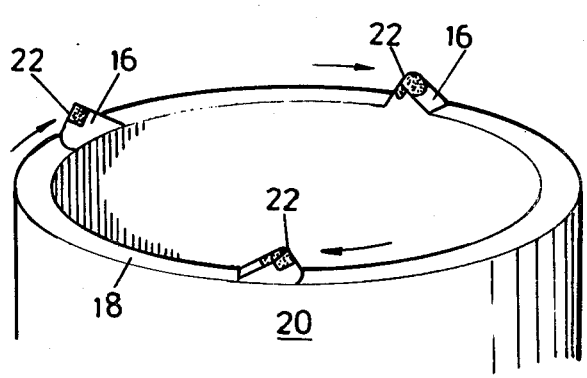
FIG. 7

ABRASIVE BODIES

This application is a continuation of application Ser. No. 240890, filed Mar. 5, 1981 now abandoned 9-2-83, which is a continuation of Ser. No. 14549 filed Feb. 23/79 abandoned.

This invention relates to abrasive bodies, and more particularly to abrasive bodies which contain abrasive compacts.

Abrasive compacts are well known in the art and consist essentially of a mass of abrasive particles, generally present in an amount of at least 70%, preferably 80 to 90% by volume of the compact, bonded into a hard conglomerate. Compacts are polycrystalline masses and can replace single large crystals. The abrasive particles of compacts are invariably super-hard abrasives such as diamond and cubic boron nitride.

Abrasive compacts, particularly diamond and cubic boron nitride compacts, may be self bonded, i.e. the individual particles of the compact may be fused and bonded together without the aid of a metal or like bonding matrix. Alternatively, stronger and more durable compacts are produced when there is a suitable bonding matrix present.

In the case of cubic boron nitride compacts, i.e. compacts in which the abrasive particle is predominantly cubic boron nitride, the bonding matrix, when provided, preferably contains a catalyst (also known as a solvent) for cubic boron nitride growth such as aluminum or an alloy of aluminum with nickel, cobalt, iron, manganese or chromium. Such catalysts tend to be soft and to minimize smearing of the catalyst during use of the compact it is preferred that the matrix also includes a ceramic such as silicon nitride which is capable of reacting with the catalyst to produce a hard material.

In the case of diamond compacts, i.e. compacts in which the abrasive particle is predominantly diamond, the bonding matrix, when provided, preferably contains a solvent for diamond growth. Suitable solvents are metals of Group VIII of the Periodic Table such as cobalt, nickel or iron or an alloy containing such a metal.

For diamond and cubic boron nitride compacts the presence of a solvent or catalyst for the particular abrasive being used in the compact is desirable because then under the conditions necessary for the manufacture of such compacts intergrowth between the particles occurs. As is known in the art, diamond and cubic boron nitride compacts are generally manufactured under conditions of temperature and pressure at which the abrasive particle is crystallographically stable.

Diamond and cubic boron nitride compacts are used for the machining and abrading of materials, including metals. The compacts may be bonded to a suitable support such as a shank to form a tool.

The compacts may be bonded to a backing such as a cemented carbide backing and then the backing bonded to the support to form the tool. Diamond and cubic boron nitride compacts bonded to a cemented tungsten carbide backing are described and illustrated in British patent specifications Nos. 1,349,385, 1,407,393 and 1,489,130.

According to the present invention, there is provided an abrasive body including an abrasive compact comprising a mass of abrasive particles, present in an amount of at least 70% by volume of the compact, bonded into a hard conglomerate; support means covering more than 50% of the surface of the compact and bonded to the compact; and the compact presenting an arcuate formation, salient in relation to the support means capable of abrading a workpiece.

The abrasive bodies may be used for a variety of abrading or machining operations. For example, the bodies may be used for grinding, cutting, drilling and dressing operations. In all these operations, it is the arcuate formation of the abrasive compact which does the abrading work. The support provides a large area by which the body may be bonded, e.g. by brazing, to a tool.

The compact will generally be in the form of a circular disc so embedded in the support means that it presents an exposed arcuate surface or edge which provides the abrading formation.

The exposed surface or edge will generally extend over 50% or less of the circumference of the disc.

The support means will, in general, be relatively massive compared with the compact. In other words, the mass of the support means will generally be more than that, preferably 5 to 15 times that of the compact. The relatively massive support means also presents a large surface area through which the body may be bonded, e.g. by brazing, to a tool.

In the abrasive bodies of the invention, the compact may be bonded to the support means directly without the presence of an interposed metal or alloy bonding layer in the manner illustrated and described in British patent specifications Nos. 1,349,385 and 1,407,393. Alternatively, the compact may be bonded to the support means through a metal or alloy bonding layer. The bonding layer may be a low temperature braze or a high temperature braze of the type described and illustrated in British patent specification No. 1,489,130. In the case of cubic boron nitride compacts, when a bonding layer is provided it is preferably a copper/tin/titanium braze. In the case of diamond compacts, when a bonding layer is provided it is preferably zirconium.

The bonding layer, when provided, is generally less than 0.5 mm, and typically in the range 50 to 500 microns, in thickness.

The invention has particular application to abrasive bodies which contain diamond and cubic boron nitride compacts as described above.

The support means is made of a high rigidity material such as high modulus steel of the M or T series or a cemented carbide. The support means is preferably made of a cemented carbide. Suitable cemented carbides are, for example, cemented tungsten carbide, cemented titanium carbide, cemented tantalum carbide and mixtures thereof. Such carbides, as is known in the art, have a metal bonding matrix usually consisting of cobalt, nickel, iron or a mixture thereof. The metal bonding matrix is usually provided in an amount of 3 to 25% by weight of the carbide.

The abrasive bodies of the invention may be made by placing compact-forming material in a cavity in suitable support means, and exposing the support means containing the compact-forming material to conditions of temperature and pressure suitable to produce a compact of the compact-forming material. Suitable conditions for compact manufacture are known in the art and are described and illustrated in the abovementioned British specifications. The method, as is known in the art, is carried out in a suitable high temperature/high pressure apparatus.

The support means may be in the form of a coherent body or it may be in a form which, when subjected to the conditions necessary for compact manufacture, forms a coherent body. A layer of a suitable bonding metal or alloy may be provided between the support means and the compact-forming material, depending on whether or not a metal or alloy bonding layer is desired.

The compact-forming material must be such as to be capable of producing an abrasive compact. Where the material is such as to produce a diamond or cubic boron nitride compact, it preferably contains a suitable matrix which may be admixed with the abrasive particles or provided in the form of a layer in contact with the abrasive particles.

Where the compact forming material is capable of producing diamond or cubic boron nitride compacts and the support means is a cemented carbide, the bonding between the compact and the support means may be direct in the manner described and illustrated in British patent specifications Nos. 1,349,385 and 1,407,393.

Where the abrasive body produced by the method does not have an exposed arcuate formation, such is provided by machining away the support means to expose an arcuate, formation or surface of the compact.

The abrasive bodies of the invention may be used as inserts for machining tools such as drill crowns. The abrasive bodies will be so mounted in the tool that the exposed arcuate formations are presented for machining.

Embodiments of the invention will now be described with reference to the accompanying drawings in which:

FIGS. 1, 2 and 3 are perspective, side and top views of one embodiment;

FIGS. 4, 5 and 6 are similar views of a second embodiment; and

FIG. 7 illustrates the mounting of three abrasive bodies in a drill crown.

Referring to FIGS. 1 to 6 of the drawing, the abrasive bodies of the two embodiments each comprise a cemented carbide support 10 in which is embedded an abrasive compact 12. The abrasive compact is bonded to the cemented carbide support either directly or through an interposed metal or alloy bonding layer in the manner described above. Each abrasive compact presents an exposed arcuate edge 14 which is capable of machining or abrading a workpiece.

FIG. 7 of the attached drawing illustrates schematically the mounting of three abrasive bodies of the invention in a drill crown. The abrasive bodies 16 are mounted in the circular end 18 of a drill crown 20. The bodies are so mounted that cutting edges 22 thereof are inclined to the direction of rotation of the crown (shown by the arrow). The bodies are secured to the drill crown by brazing the supports to the crown. The supports provide a large area for brazing thus ensuring that the bodies are firmly held in the crown.

In a further example of the invention, a cemented tungsten carbide cup was provided. A thin zirconium foil, of thickness about 100 microns, was placed on the inside surface of the cup such that it lined this surface. The cup was then filled with a mixture of diamond particles and cobalt powder. The cup and its contents were placed in the reaction zone of a conventional high temperature/high pressure apparatus and subjected to a temperature of about 1500° C. and a pressure of about 60 kilobars. These elevated conditions of temperature and pressure were maintained for about 20 minutes. The temperature was allowed to return to ambient conditions and the pressure was released. The cup was removed from the reaction zone. The body as so produced consisted of a cup of cemented tungsten carbide having embedded therein a circular disc of diamond compact. The diamond compact was bonded to the cup by means of a zirconium bonding layer. One side of the cup was ground away to expose an arcuate surface of the diamond compact, so producing an abrasive body of the type illustrated by FIGS. 1, 2 and 3 of the accompanying drawings.

I claim:

1. A drill crown including a rotatable circular end having mounted therein a plurality of abrasive bodies, each abrasive body including an abrasive compact comprising a mass of diamond or cubic boron nitride particles, present in an amount of at least 70 percent by volume of the compact, bonded into a hard conglomerate and support means covering a part of the surface of the compact and bonded to the compact, wherein the support means covers more than 50 percent of the surface of the compact and wherein the compact is in the form of a circular disc embedded in the support means so as to provide an exposed arcuate surface or edge which extends over less than 50 percent of the circumference of the disc and which provides an abrading formation, the support means of each abrasive body being embedded in the circular end of the crown and secured thereto by brazing and the exposed arcuate surface or edge of each body presenting an exposed abrading formation for the crown.

2. The drill crown according to claim 1 wherein the exposed arcuate surface of each body is inclined to the direction of rotation of the crown.

3. The drill crown according to claim 1 wherein the mass of the support means is more than that of the compact.

4. The drill crown according to claim 3 wherein the mass of the support means is 5 to 15 times that of the compact.

5. The drill crown according to claim 1 wherein the compact is bonded to the support means directly without the presence of an interposed metal or alloy bonding layer.

6. The drill crown according to claim 1 wherein the compact is bonded to the support means through a metal or alloy bonding layer.

7. The drill crown according to claim 6 wherein the bonding layer is less than 0.5 mm in thickness.

8. The drill crown according to claim 6 wherein the bonding layer is 50 to 500 microns in thickness.

9. The drill crown according to claim 1 wherein the abrasive compact is a cubic boron nitride compact.

10. The drill crown according to claim 9 wherein the compact includes a matrix which contains a catalyst for cubic boron nitride growth.

11. The drill crown according to claim 10 wherein the catalyst is aluminum or an aluminum alloy.

12. The drill crown according to claim 1 wherein the compact is a diamond compact.

13. The drill crown according to claim 12 wherein the compact includes a matrix which contains a solvent for diamond growth.

14. The drill crown according to claim 13 wherein the solvent is cobalt.

15. The drill crown according to claim 1 wherein the cemented carbide is cemented tungsten carbide, cemented titanium carbide, cemented tantalum carbide or a mixture thereof.

* * * * *